US006792487B2

(12) United States Patent
Kao

(10) Patent No.: US 6,792,487 B2
(45) Date of Patent: Sep. 14, 2004

(54) UNIVERSAL SERIAL BUS (USB) CONNECTOR CONNECTING STRUCTURE FOR A MULTI-FUNCTION DEVICE

(76) Inventor: Chia-Hung Kao, 5f., No. 22, Aly. 3, Lan 289, Chuang-Ching Rd., Taipei (TW), 110

( * ) Notice: Subject to any disclaimer, the term of this patent is extended or adjusted under 35 U.S.C. 154(b) by 0 days.

(21) Appl. No.: 10/318,149

(22) Filed: Dec. 13, 2002

(65) Prior Publication Data

US 2004/0103228 A1 May 27, 2004

(51) Int. Cl.[7] ................................ G06F 13/38
(52) U.S. Cl. ................................ 710/74; 710/62
(58) Field of Search ................................ 710/72, 73, 74

(56) References Cited

U.S. PATENT DOCUMENTS 4,628,717 A * 12/1986 Blum ....................... 70/456 R
6,375,479 B1 * 4/2002 Johnson et al. ............. 439/131
6,498,601 B1 * 12/2002 Gujar et al. ................ 345/173
6,567,273 B1 * 5/2003 Liu et al. .................... 361/737
6,650,534 B2 * 11/2003 Tree .......................... 361/686
6,671,808 B1 * 12/2003 Abbott et al. ............... 713/200
2003/0103369 A1 * 6/2003 Wu ............................ 365/131

FOREIGN PATENT DOCUMENTS

CN WO 02/82273 A1 10/2002

* cited by examiner

*Primary Examiner*—Jeffrey Gaffin
*Assistant Examiner*—Alan Chen
(74) *Attorney, Agent, or Firm*—Troxell Law Office PLLC

(57) ABSTRACT

A universal serial bus (USB) connector connecting structure for a multi-function device comprises a shell, a memory unit installed in said shell, and a universal serial bus, installed at one side of said shell, electrically contacted to said memory unit. Said universal serial bus (USB) is electrically contacted to and embedded on a sliding mechanism which is settled on a built-in fixed bed at one inner side of said shell, whereby said universal serial bus (USB) can be slide out from and stored in said shell by the means of said sliding mechanism.

6 Claims, 9 Drawing Sheets

UNIVERSAL SERIAL BUS (USB) CONNECTOR CONNECTING STRUCTURE FOR A MULTI-FUNCTION DEVICE

FIELD OF THE INVENTION

This invention relates to a universal serial bus (USB) connector connecting structure for a multi-function device and more particularly to a method for said universal serial bus (USB) being slide out from and stored in its shell by the means of a sliding mechanism.

BACKGROUND OF THE INVENTION

The improvement of information technology bringing up continuous inventions of the elements for personal computers has made computers essential electronic products for the public; therefore, computer peripherals and components are pursued for users to expand, retrofit, or escalate their computers. The most popular element thereof is the portable external hard disk for its convenience.

Generally, a conventional portable external hard disk, as FIG. 7 shows, consists of shell 7 in which is allocated a USB transmission interface (not shown) for connected to a memory module, whereby universal serial bus (USB) connector 71 of said USB transmission interface stands out from one side of shell 7 and is protected by cover 72.

However, because of the nature of the above-mentioned design, cover 72 is easily missing after dismounted by users when users need to plug universal serial bus (USB) connector 71 into connecting socket. Consequently, universal serial bus (USB) connector 71 without the protection of cover 72 would be easily damaged. In sum, the portable external hard disk that FIG. 7 shows does not corresponded to users' demand.

SUMMARY OF THE INVENTION

It is, therefore, an object of the present invention to provide a universal serial bus (USB) connector connecting structure for a multi-function device and particularly to offer a method for said universal serial bus (USB) being slide out from and stored in its shell by the means of a sliding mechanism.

The foregoing object is accomplished by providing a universal serial bus (USB) connector connecting structure for a multi-function device, consisting of a shell, a memory unit installed in said shell, and a universal serial bus, installed at one side of said shell, electrically contacted to said memory unit Said universal serial bus (USB) is electrically contacted to and embedded on a sliding mechanism which is settled on a built-in fixed bed at one inner side of said shell, whereby said universal serial bus (USB) can be slide out from and stored in said shell by the means of said sliding mechanism.

BRIEF DESCRIPTION OF THE DRAWINGS

The present invention will be better understood from the following detailed description of preferred embodiments of the invention, taken in conjunction with the accompanying drawings, in which

FIG. 4-1 and FIG. 4-2 show diagrams of sliding in and out the present invention;

FIG. 5-1 and FIG. 5-2 show diagram of sliding in and out the loaded bed according to present invention;

DESCRIPTION OF THE PREFERRED EMBODIMENTS

According to the disadvantages of conventional universal serial bus (USB) connector connecting structure as described above, the present invention provides an improvement solution for that. Embodiments of this invention will be described in detail with reference to attached drawings.

Figure 1:
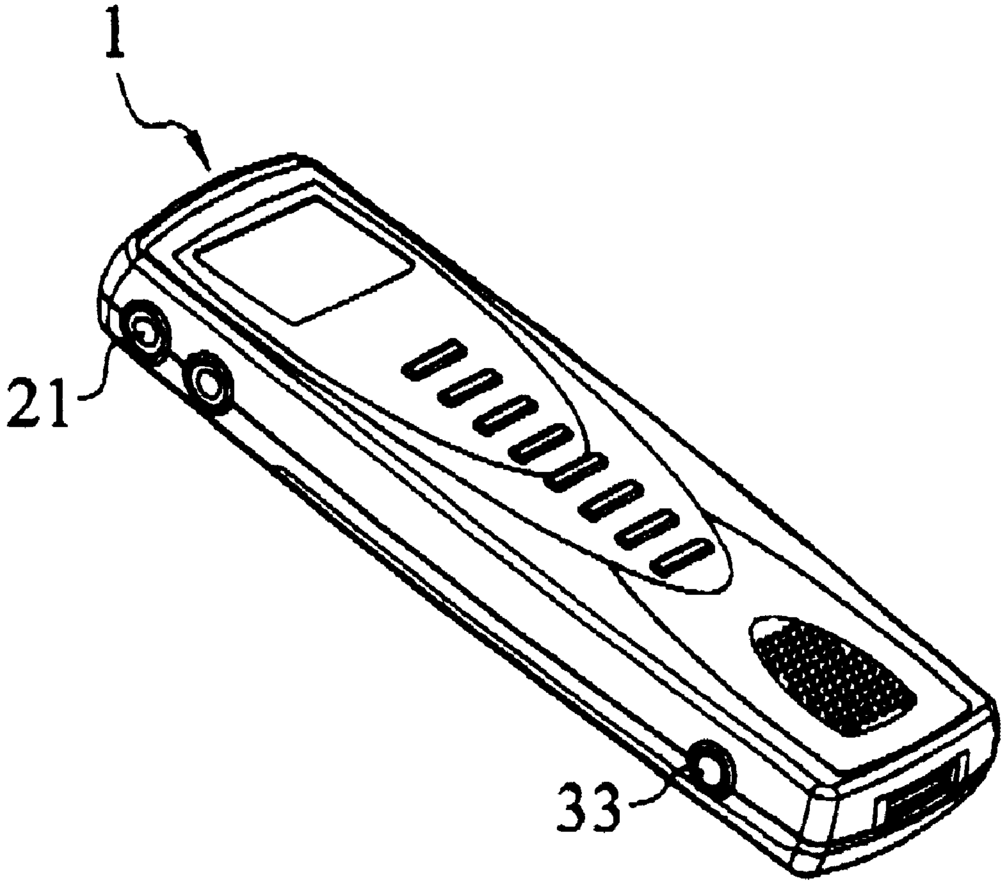
FIG. 1 is an appearance stereograph of the present invention.
Figure 2:
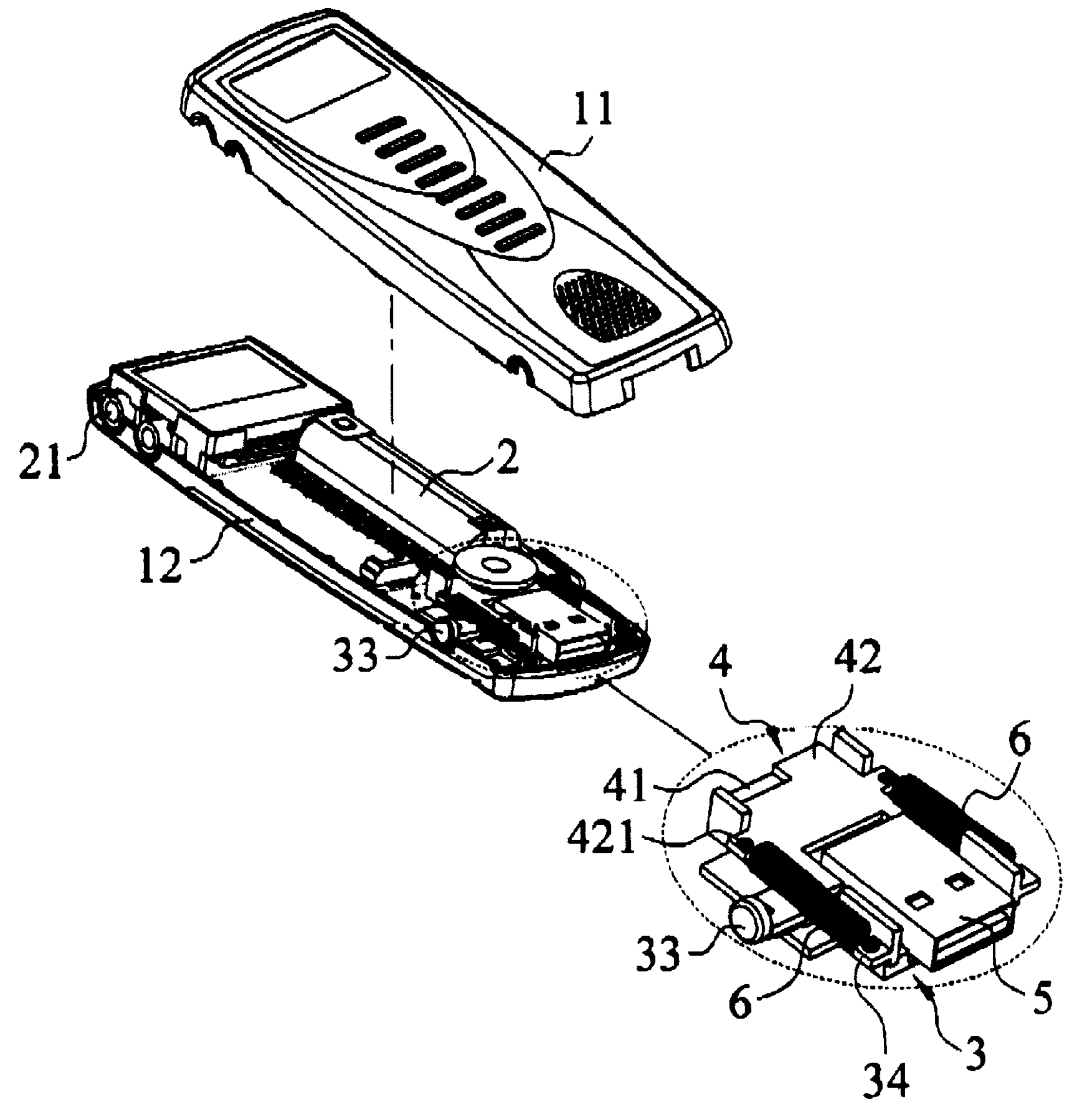
FIG. 2 is a decomposable stereograph of present invention.
Figure 3:
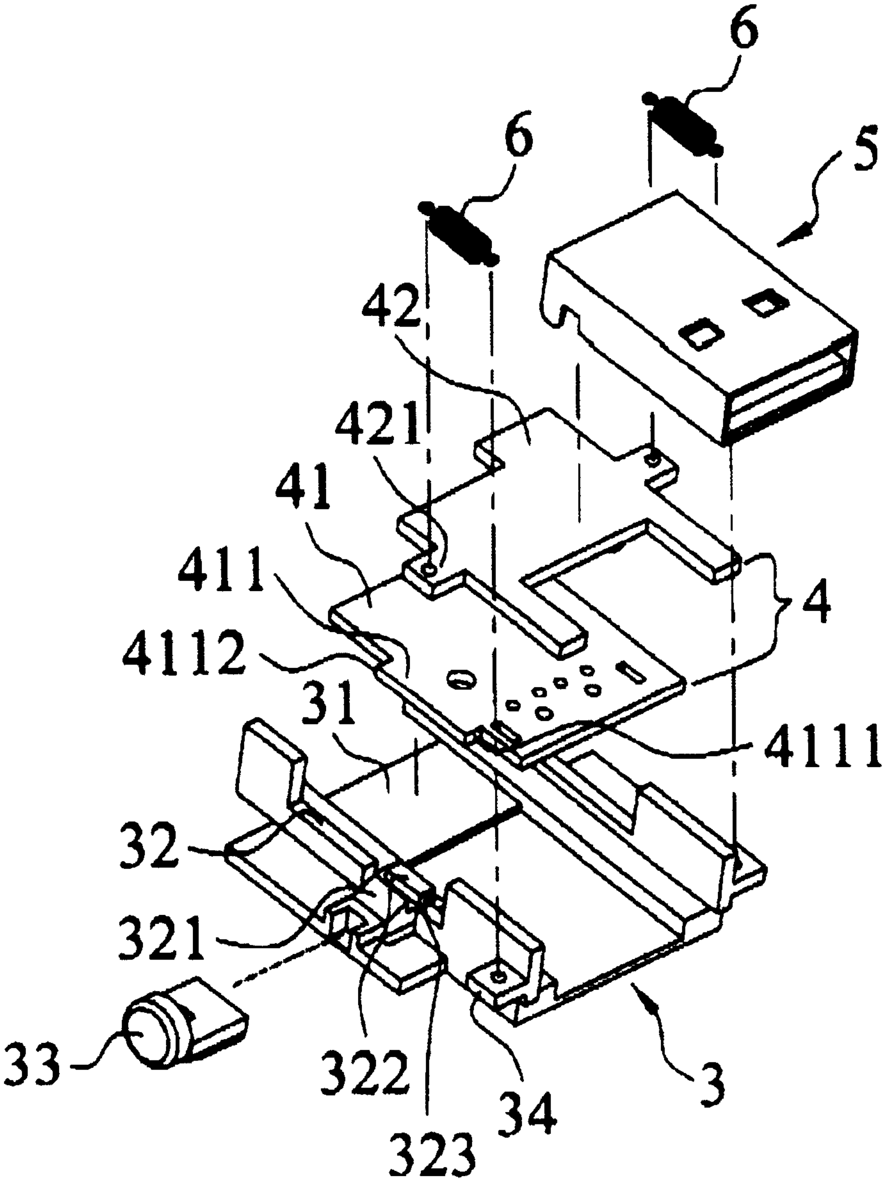
FIG. 3 is a partial amplification diagram of present invention.
Figures 1, 4:
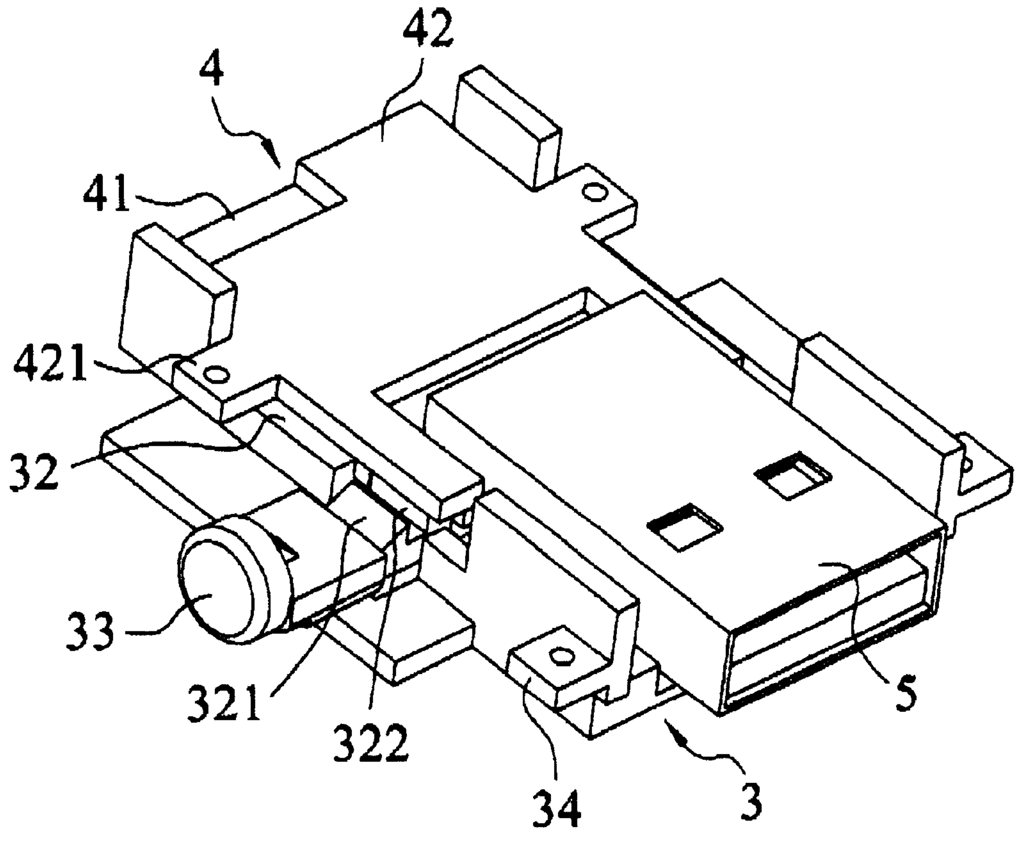
Figures 2, 4:
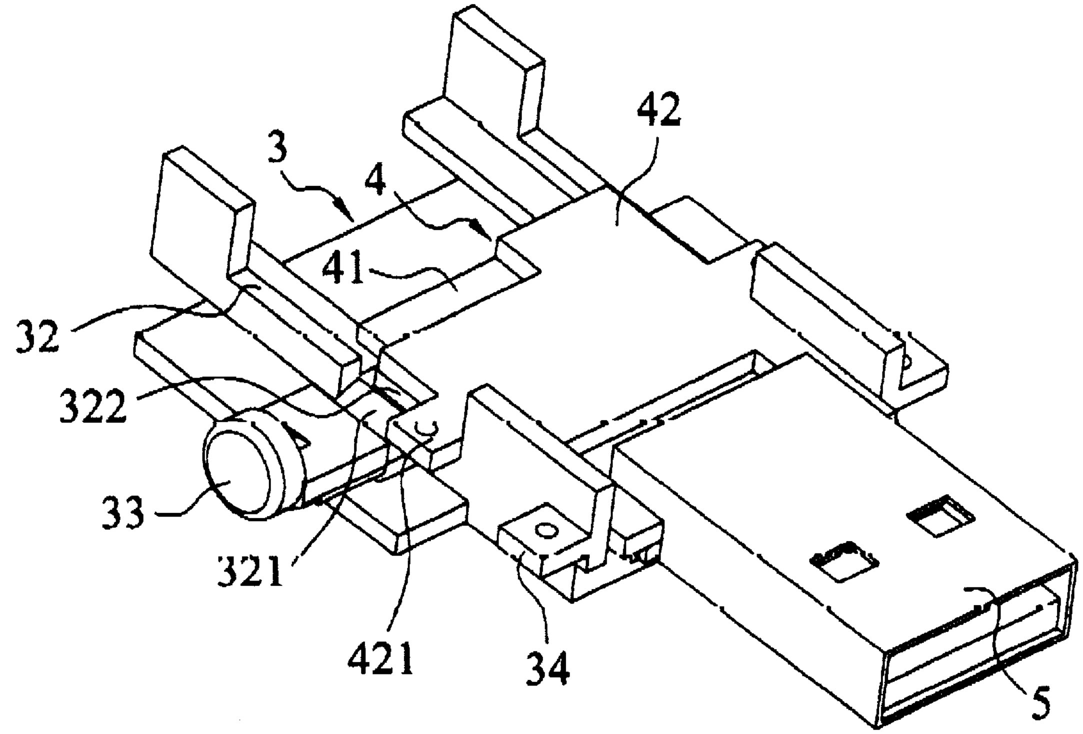
Figures 1, 5:
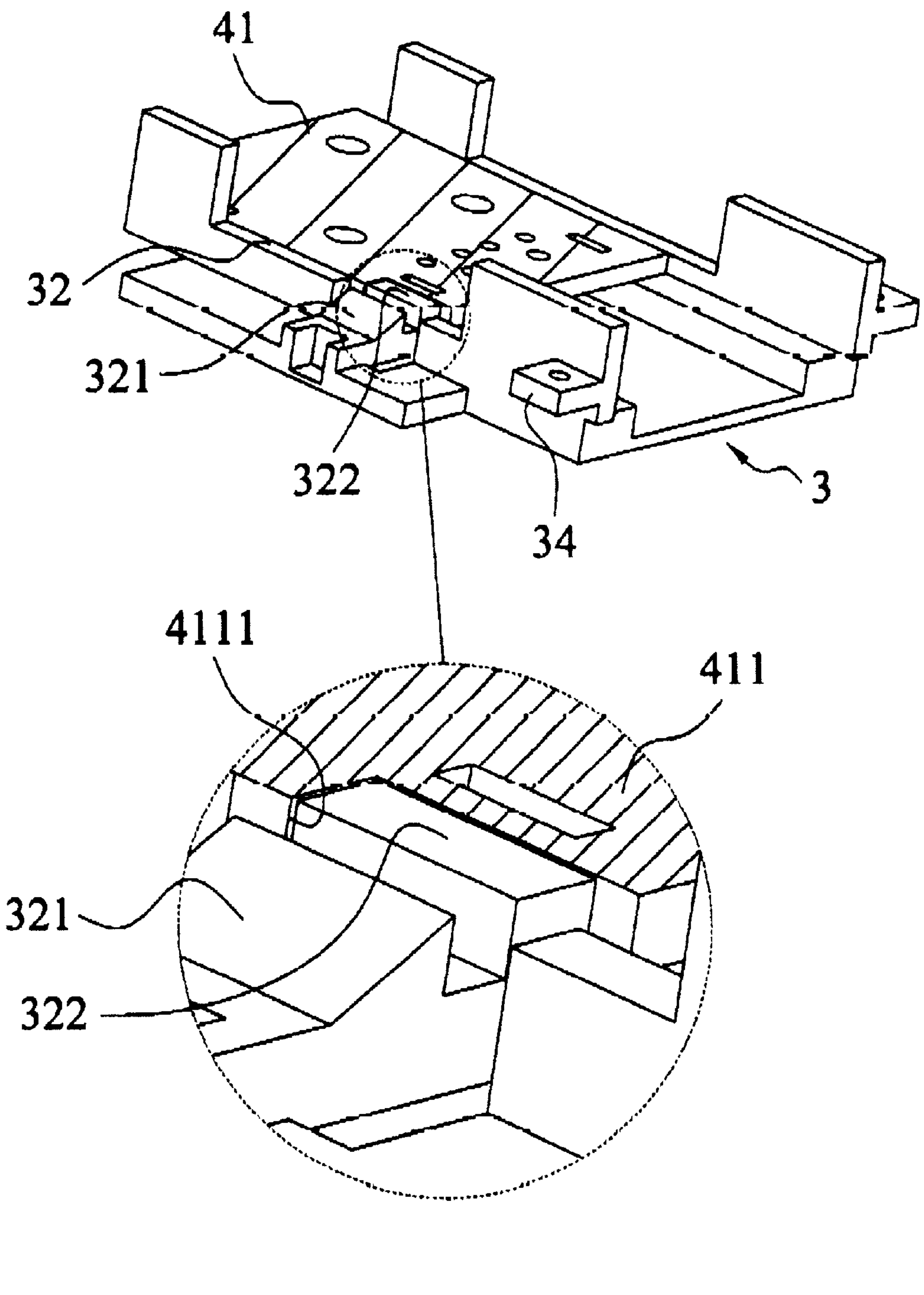
Figures 2, 5:
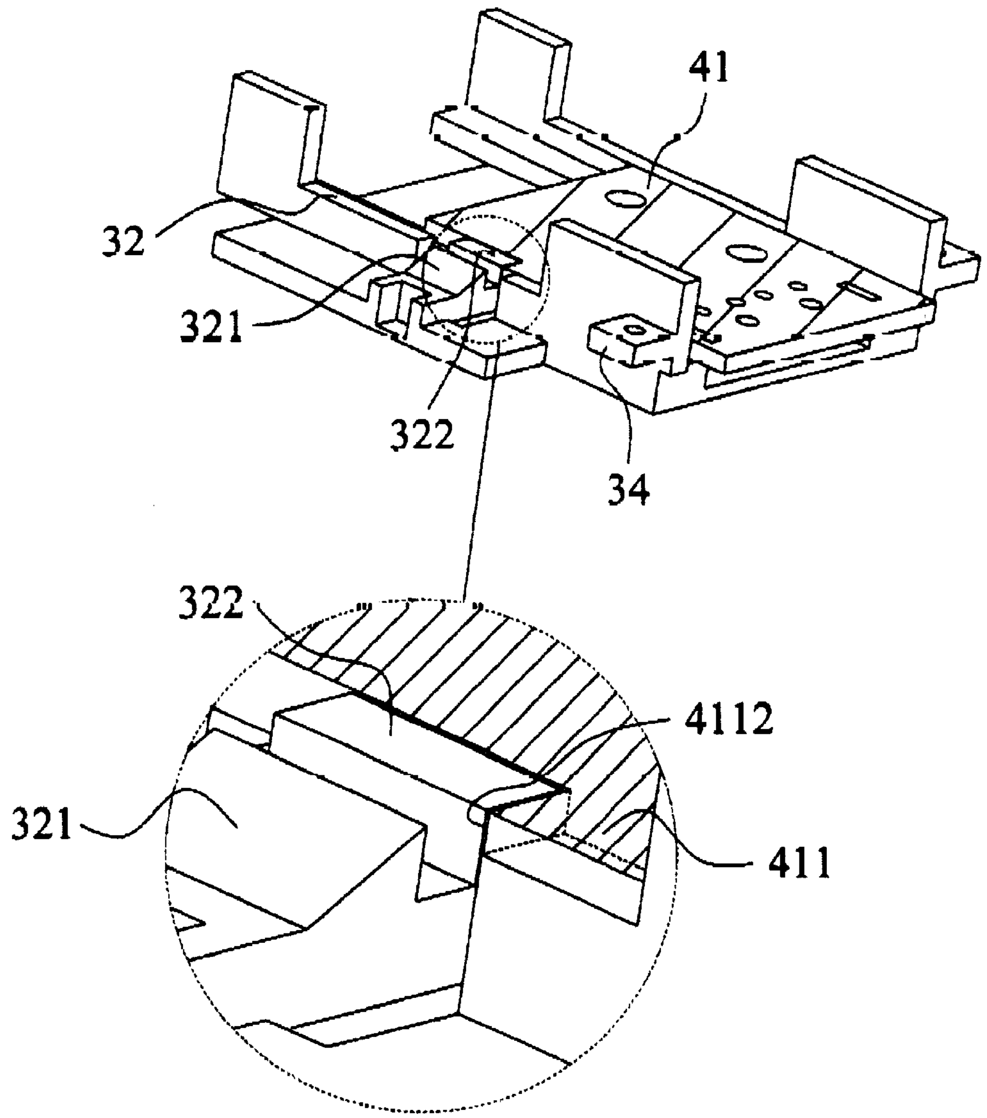
Figure 6:
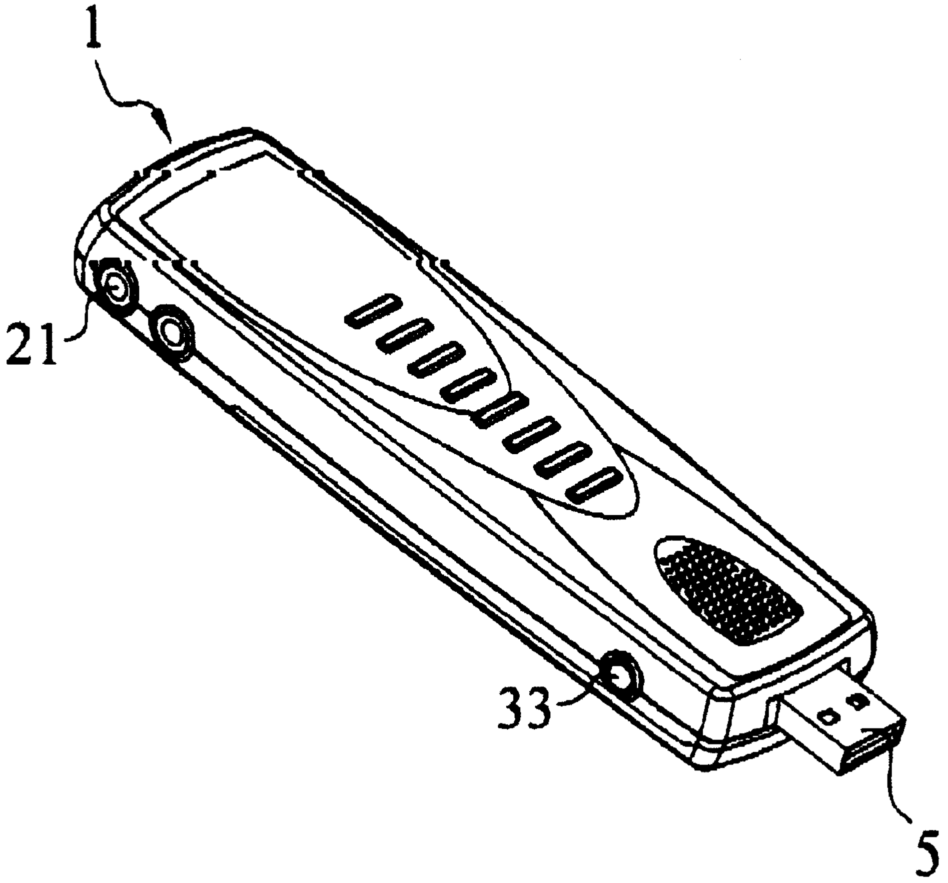
FIG. 6 is a diagram of the present invention in operation.
Figure 7:
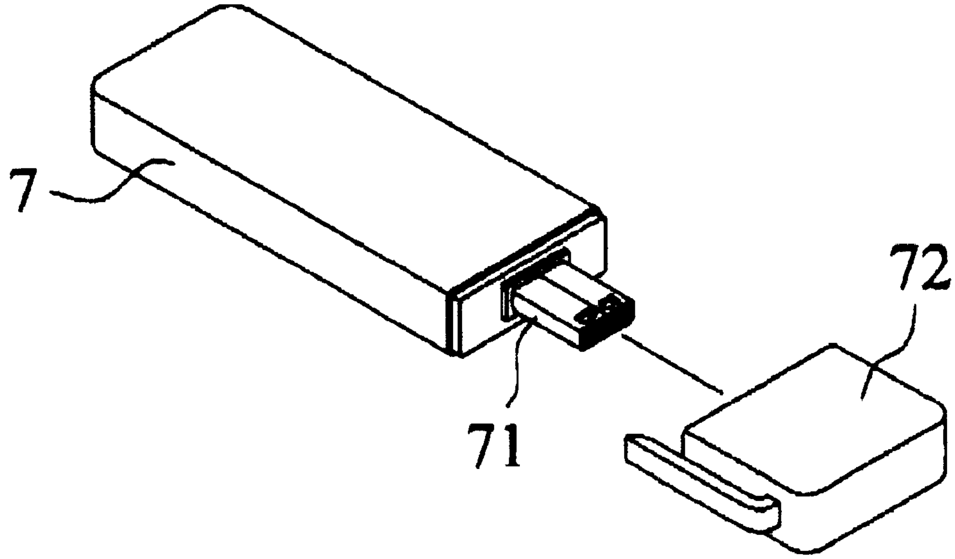
FIG. 7 (Prior Art)
FIG. 7 is a diagram of a conventional device.

Referring to FIG. 1, FIG. 2, and FIG. 3 for an appearance stereograph, a decomposable stereograph, and a partial amplification diagram of the present invention, illustrate a universal serial bus (USB) connector connecting structure for a multi-function device, comprising shell 1, memory unit 2, fixed bed 3, sliding mechanism 4, and universal serial bus 5, which enables universal serial bus (USB) 5 to be slide out from and stored in said shell 1. The above-mentioned shell 1 is composed of upper cover 11 and bottom cover 12. Said memory unit 2 is embedded inside shell 1 and electrically contacted to every exposed push buttons 21 on one side of shell 1.

Embedded inside the bottom cover 12 of said shell 1, said fixed bed 3 comprises spacing 31 of which channel 32 with fixed part 34 beside is symmetrically settled on each two opposite sides, wherein the surface of said channel 32 on one side of spacing 31 consists of reed 321, with lump 322 above and press button 33 at one end exposed on one side of said shell 1.

Settled inside said spacing 31 of said fixed bed 3, said sliding mechanism 4 is composed of loaded bed 41 with stop kit 42. Said universal serial bus (USB) 5 is electrically contacted to and built-in on said loaded bed 41 of said sliding mechanism 4. While baffle 411, settled on one side of said loaded bed 41, creates a fan or a boundary with said lump 322 on said reed 321, said baffle 411 and wings 421, each of which is settled on two opposite sides of said stop kit 42, are limited inside said channels 32 of said spacing 31. Said wings 421 approaches limit by wall 323 of said channel 32. In addition, each of two said fixed parts 34 of said fixed bed 3 comprises a spring 6 connecting on two said two said wings 421 of said stop kit 42 of said sliding mechanism 4. Consequently, the foregoing structure brings out a bran-new a universal serial bus (USB) connector connecting structure for a multi-function device.

Refer now to FIG. 4-1, FIG. 4-2, FIG. 5-1, FIG. 5-2, and FIG. 6 for activity diagrams of sliding in and out the present invention, condition diagrams of sliding in and out the loaded bed according to present invention, and a condition diagram of the present invention in operation. When the device is not in operation, wall 4111 of said baffle 411 on one side of said loaded bed 41 and said lump 322 on said reed 321 create a boundary or fan for storing said universal serial bus (USB) 5 that is built-in on said sliding mechanism 4 Users can operate the device by pushing press button 33 on one face side of said shell 1 to eject said universal serial bus (USB) 5. The process of how said universal serial bus (USB) 5 being ejected is described hereinafter. Said press button 33 clamps said reed 321 on the surface of said channel 32 when being pushed, which makes said lump 322 on said reed 321 press down to disengage wall 4111 of said baffle 411 on one side of said loaded bed 41 from the limit of lump 322. Then, said sliding mechanism 4 is ejected by the means of said springs 6 on two sides of stop kit 42 settled on said fixed bed 3 and said sliding mechanism 4; meanwhile, said wings 421 of two sides of stop kit 42 of said sliding mechanism 4 slide forward in said channels 32. When said wings 421 slide to wall 323 of said channels 32, said sliding mechanism 4 is blocked by said wings 421 of said stop kit 42 and wall 323 of said channels 32. Furthermore, it is other wall 4112 of said loaded bed 41 of said baffle 411 that seizes said lump 322 on said reed 321 to stop said universal serial bus (USB) 5 from being pushed back into said shell 1 by external fore. Thus, users could read information by plugging said universal serial bus (USB) 5, stretching out from said shell 1, into socket connector (not shown in the enclosed drawings).

On the other hand, because wall 4112 of said baffle 411 on one side of said loaded bed 41 is disengaged from the limit of bulk 322 by the pressing of said bulk 322 on said reed 321 when press button 33, users can push said universal serial bus (USB) 5, fixed on said sliding mechanism 4, into said shell 1 by their hands while pressing said press button 33 on one face side of said shell 1. Users could release said press button 32 after said universal serial bus (USB) is totally stored into said shell 1; then, said lump 322 on said reed 321 and said baffle 411 of one side of said loaded bed 41 create a fan for housing said universal serial bus (USB) 5 inside said shell 1. Consequently, it is accomplished a connecting structural reinforcement for universal serial bus (USB) 5 being slide out and storing into said shell 1 by the means of said sliding mechanism 4.

In summation of the foregoing section, the invention herein fully complies will all new patent application requirement and is hereby submitted to the patent bureau for review and the granting of the commensurate patent rights.

The present invention may be embodied in other specific forms without departing from the spirit of the essential attributes thereof; therefore, the illustrated embodiment should be considered in all respects as illustrative and not restrictive, reference being made to the appended claims rather than to the foregoing description to indicate the scope of the invention.

What is claimed is:

1. A universal serial bus connector connecting structure for a multipurpose device comprising:

a) a shell;

b) a memory unit located in an interior of the shell;

c) a fixed bed located in the interior of the shell and having:

i) two spaced apart channels;

ii) a reed located on one of the two channels;

iii) a press button connected to the reed; and iv) two fixed parts, one fixed part located adjacent to each channel;

d) a sliding mechanism slidably connected to the fixed bed and movable between first and second positions; and e) a universal serial bus electrically connected to the memory unit and the sliding mechanism, the universal serial bus fixedly connected to the sliding mechanism, wherein the universal serial bus is located in the interior of the housing when the sliding mechanism is in the first position, and the universal serial bus extends outwardly from an opening in the housing when the sliding mechanism is in the second position.

2. The universal serial bus connector according to claim 1, further comprising two springs, each of the two springs connected at a first end to the sliding mechanism and at a second end to the fixed bed.

3. The universal serial bus connector according to claim 1, wherein the fixed bed includes a lump located adjacent to the reed.

4. The universal serial bus connector according to claim 1, wherein the sliding mechanism includes a loaded bed having a stop kit, the universal serial bus is electrically and fixedly connected to the loaded bed.

5. The universal serial bus connector according to claim 4, wherein the loaded bed includes a baffle located on a side thereof.

6. The universal serial bus connector according to claim 4, wherein the stop kit includes two wings located on opposing sides thereof.

* * * * *